(No Model.) 4 Sheets—Sheet 1.

T. ROBERTSON.
CONFECTIONERY MACHINE.

No. 488,404. Patented Dec. 20, 1892.

Witnesses
J. Edw. Maybee
W. C. McMillan

Inventor
Thomas Robertson
by Donald C. Ridout & Co.
Atty.

(No Model.) 4 Sheets—Sheet 2.
T. ROBERTSON.
CONFECTIONERY MACHINE.

No. 488,404. Patented Dec. 20, 1892.

Witnesses
J. Edw. Maybee
W. C. McMillan

Inventor
Thomas Robertson
by Donald C. Ridout & Co.
Atty (No Model.) 4 Sheets—Sheet 3.

T. ROBERTSON.
CONFECTIONERY MACHINE.

No. 488,404. Patented Dec. 20, 1892.

Witnesses
J. Edw. Maybee
W. G. McMillan

Inventor
Thomas Robertson
by Donald C. Ridout & Co.
Attys (No Model.) 4 Sheets—Sheet 4.

T. ROBERTSON.
CONFECTIONERY MACHINE.

No. 488,404. Patented Dec. 20, 1892.

Witnesses
J. Edw. Maybee
W. G. McMillan

Inventor
Thomas Robertson
by Donald C. Ridout & Co.
Attys.

THE NORRIS PETERS CO., PHOTO-LITHO., WASHINGTON, D. C.

UNITED STATES PATENT OFFICE.

THOMAS ROBERTSON, OF TORONTO, CANADA.

CONFECTIONERY-MACHINE.

SPECIFICATION forming part of Letters Patent No. 488,404, dated December 20, 1892.

Application filed July 7, 1892. Serial No. 439,209. (No model.)

*To all whom it may concern:*

Be it known that I, THOMAS ROBERTSON, confectioner, of the city of Toronto, in the county of York, in the Province of Ontario, Canada, have invented a certain new and useful Improvement in Confectionery-Machines, of which the following is a specification.

The object of the invention is to make a simply constructed machine which will automatically make, arrange in rows and deliver "drops" made from fine sugar and gum, and it consists essentially, of a reservoir containing a glutinous liquid and having a series of rubber tubes extending from its interior, means for expelling the glutinous liquid from the reservoir through the tubes, means for cutting off the "drops" and means for manipulating the "drops" after they have been formed.

Figure 1:
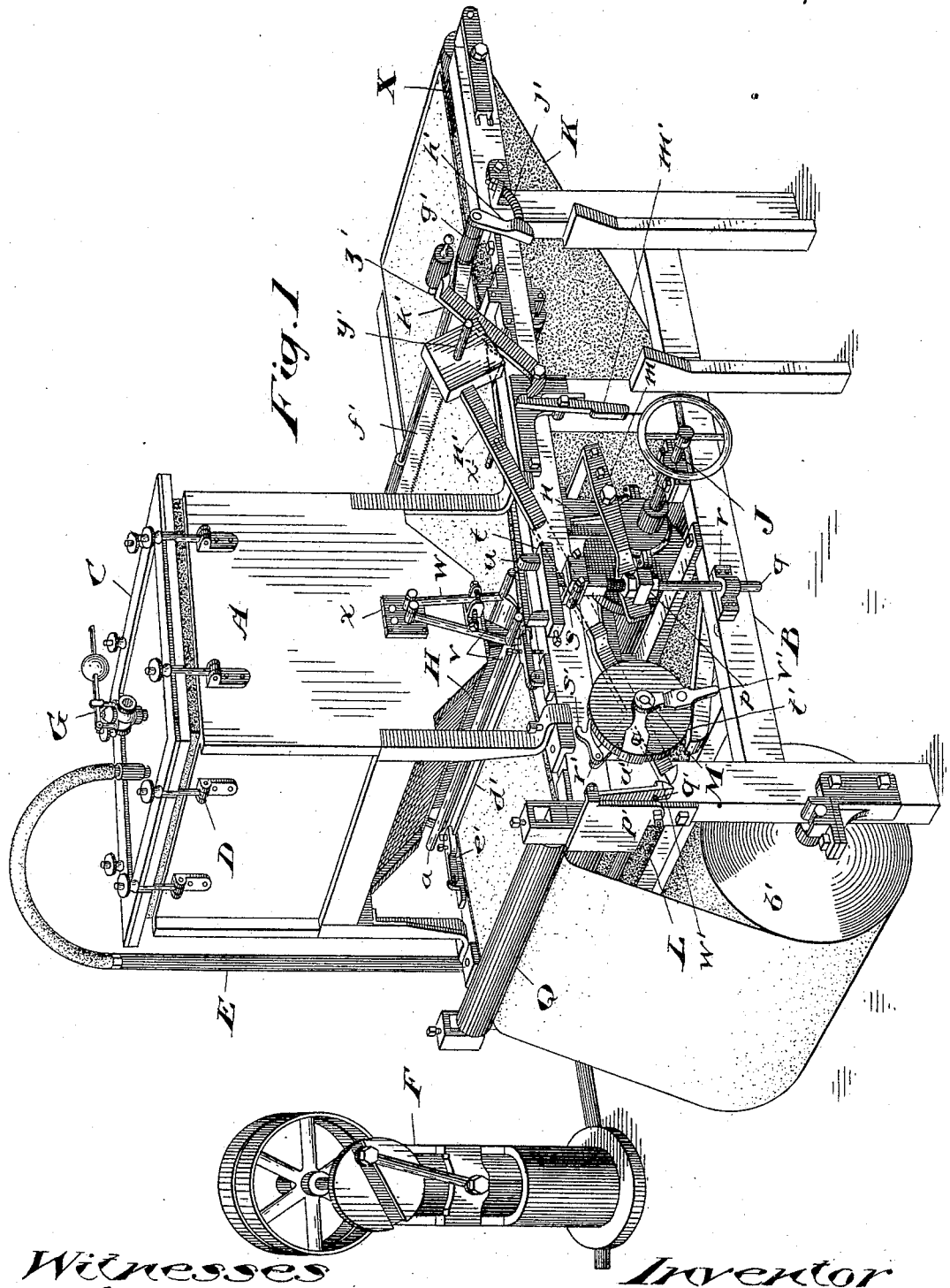
Figure 2:
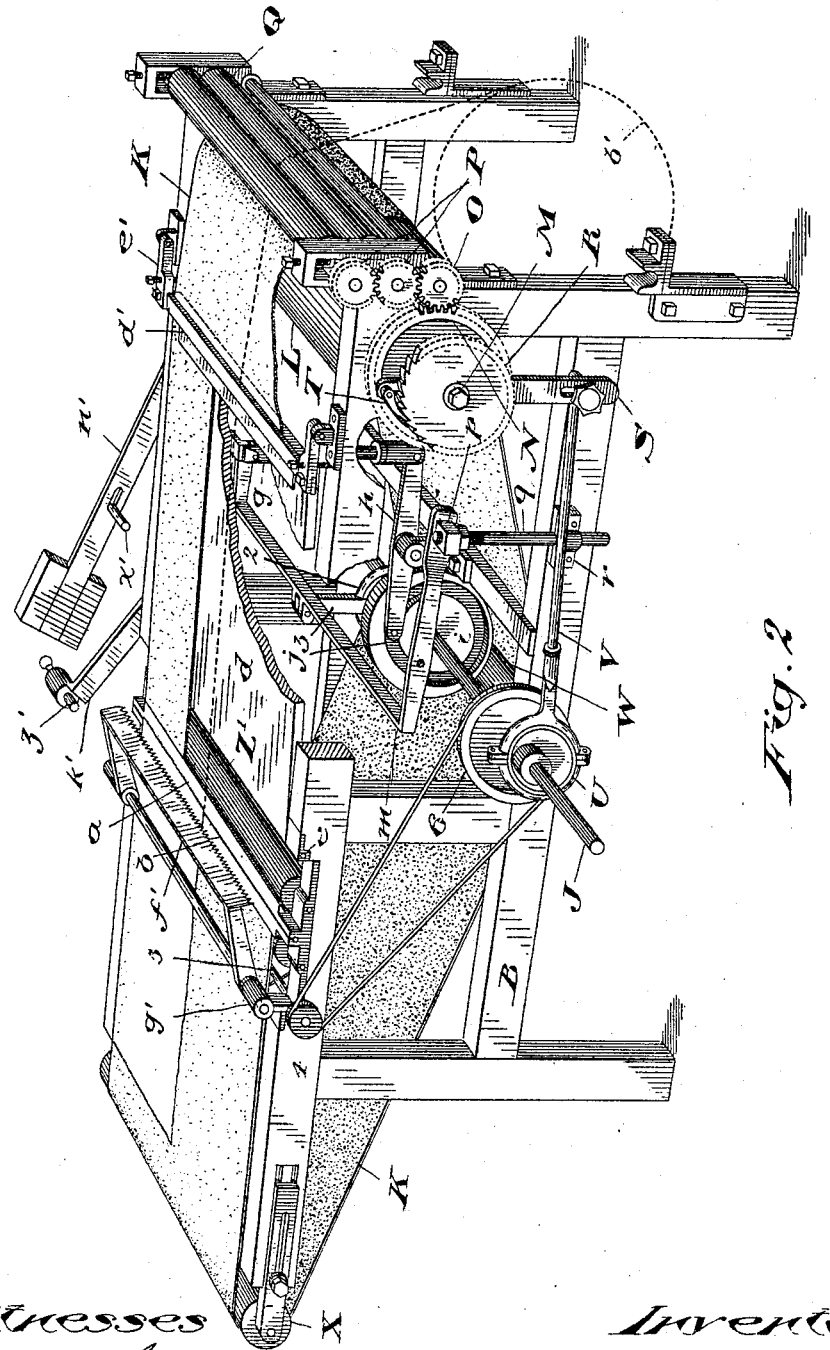
Figure 3:
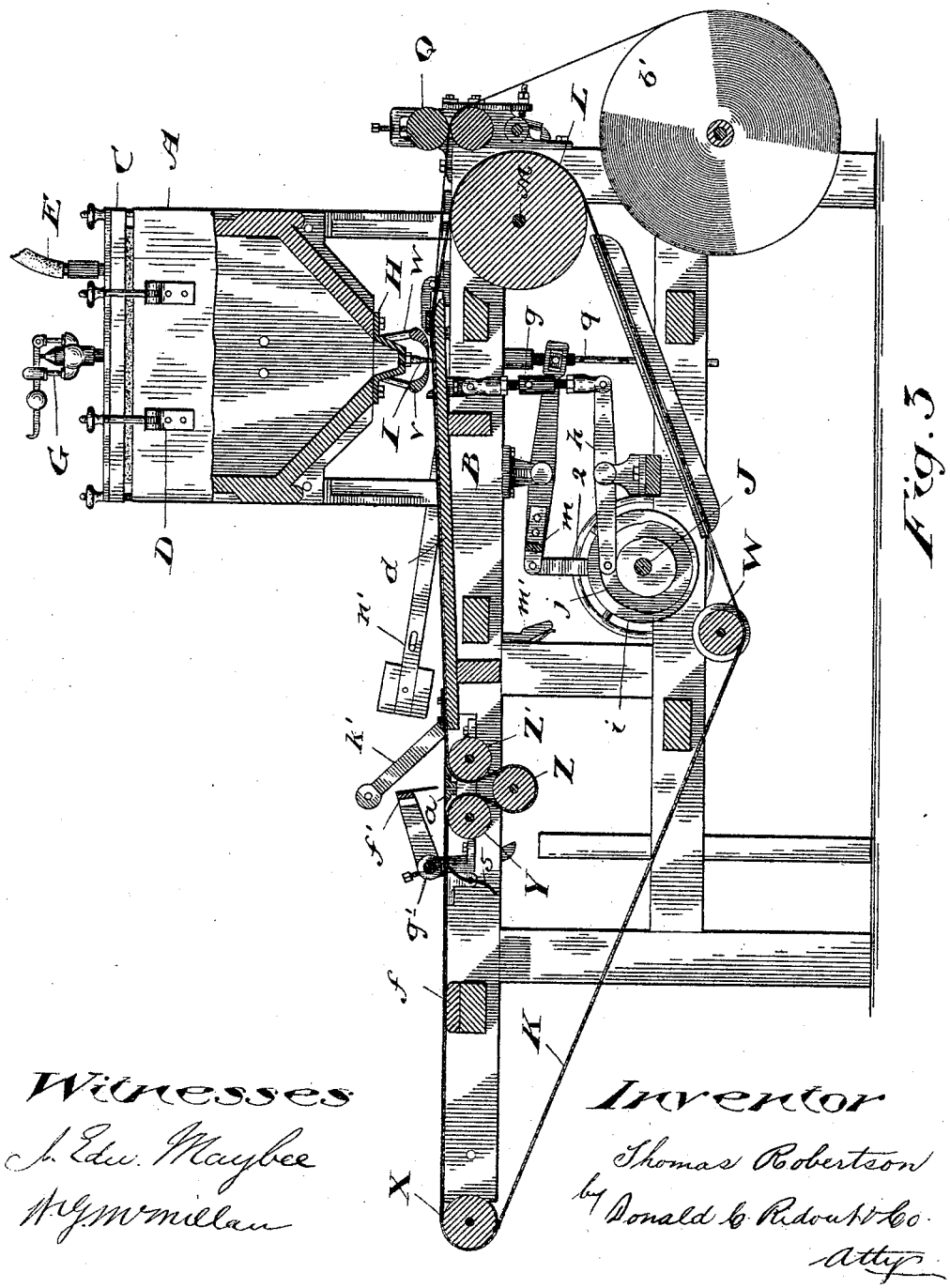
Figure 4:
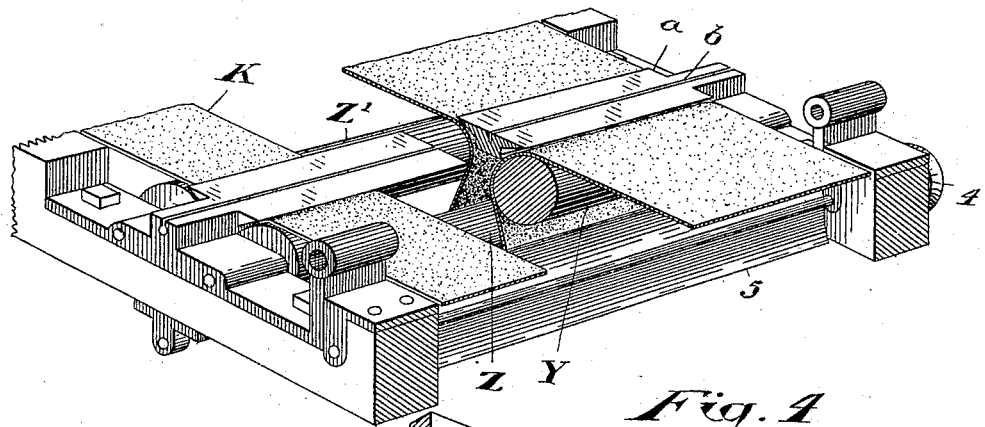
Figure 7:
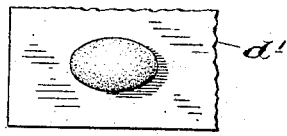
Figure 5:
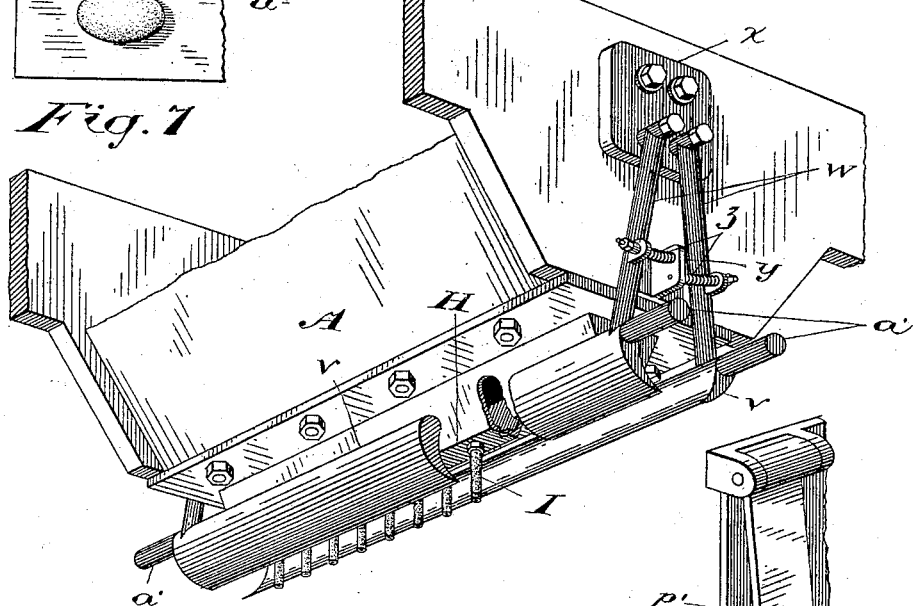
Figure 6:
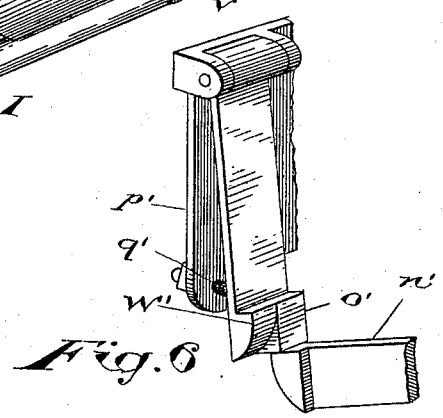

Figure 1, is an outside perspective view from one side of the machine. Fig. 2, is a similar view from the opposite side of the machine, the reservoir being removed and a portion of the frame cut away to expose the interior construction. Fig. 3, is a longitudinal side section of the machine. Fig. 4, is an enlarged perspective view partially in section of the endless apron rollers and parts connected therewith. Fig. 5, is an enlarged perspective detail of the bottom of the reservoir and means for forming the "drops." Fig. 6, is an enlarged perspective detail of the trip increasing the movement of the apron. Fig. 7, is a view of a drop.

The fine class of goods which I have termed "drops" and which are known by various titles by different manufacturers, are made of fine sugar and gum and have hitherto been manufactured by hand-tools of different kinds well known to manufacturers of confectionery and which in this specification it is not necessary to describe. The fact that these goods had to be manufactured by hand has made this particular class very expensive to produce, as the operation was not only a tedious one, but required considerable skill on the part of the manipulator.

In designing my machine, I have kept in view the fact that the commercial value of the "drop" requires that every "drop" should be uniform in size and appearance, and I have constructed the machine so that large quantities of the "drops" can be made very quickly without any skill on the part of the operator and practically without manual labor.

It will be understood that various changes in the structure of the machine and in the arrangement of the mechanical parts may be made without altering the principles involved in the invention, but for the purpose of this specification, I shall describe in detail the exact construction of the machine illustrated in the drawings and following the usual practice, will sum up the points of construction which are involved in the invention.

A, represents a hopper-shaped reservoir suitably supported as indicated upon the main frame B, of the machine. The interior of the reservoir A, is smooth and designed to contain the composition of sugar and gum or other material from which the "drops" are to be made. The reservoir A, is provided with a cover C, constructed so that it can be hermetically sealed to the top of the reservoir A, hinged screw bolts D, being provided, as indicated so that the cover C may be readily secured in position and easily removed when required.

E, represents a pipe leading from the interior of the reservoir A, to an air pump F, which may be made of any ordinary construction and operated by power or otherwise. This pump is provided for the purpose of creating a heavy pneumatic pressure within the reservoir A, the safety valve G, being provided so that the atmospheric pressure within the reservoir may be regulated to suit the character of the composition, and the speed at which it is designed that the composition should be expelled from the said reservoir.

Through the bottom H, of the reservoir A, I make a series of holes from each of which projects a tube I, made of rubber or similar material and through which tubes I, the composition is forced by the atmospheric pressure before referred to and which is manipulated substantially in the manner and in connection with the devices hereinafter more particularly explained, so that the material being forced through the tubes shall be formed into "drops" of the desired shape, the said "drops" being automatically arranged upon paper which is cut into proper lengths and put on trays and deposited in the drying room.

J, represents the main driving shaft from which the various working parts of the machine derive their motion, as hereinafter explained.

K, is an endless apron made of felt, rubber or other suitable material and supported at one end by a large roller or drum L. This drum is fixed to the shaft M. A spur wheel N is fixed to the shaft M, and meshes with a pinion O, which pinion is carried in a suitable bearing supported on the frame B and is adapted to communicate motion from the spur wheel N to the pinions marked P, which pinions are fixed to the spindles of the rollers Q, between which the paper $b'$ passes and is fed onto and with the endless apron K. A ratchet-wheel R, is fixed to the shaft M, and an arm S, is loosely journaled on the said shaft and provided with a ratchet pawl T, arranged to engage with the teeth on the ratchet wheel R. An eccentric U, is fixed to the driving shaft J, and is provided with an eccentric rod V, adjustably connected to the arm S, as indicated, so that the length of the stroke of the arm S, may be readily adjusted for the purpose of causing the pawl T, to take one or more teeth in the ratchet wheel R, at each revolution of the eccentric U. The lower part of the apron K, passes from the drum L, below the roller W, thence up around the roller X, and back along the top of the machine. The roller X, is carried on adjustable bearings so that the endless apron K, may be tightened or loosened as required. When the endless apron K, leaves the roller X, it is extended in a horizontal position on the top of the machine until it reaches the roller Y (see Fig. 4). It is then carried down to and around the roller Z and then up around the roller Z' and finally to the drum L. This detour of the apron K, is made for the purpose of leaving a space into which the metal plate $a$, may be inserted. This metal plate is made as shown in Fig. 4, with a groove $b$, in it for the purpose hereinafter explained.

To support the endless apron K and the paper $b'$ in a horizontal position, I provide on top of the machine and below the apron K a stationary table $f$, between the rollers X, and Y, and on the opposite side of the rollers Z' I pivot at $e$, a table $d$, which extends below the reservoir A and is carried by a vertical rod $g$. This rod is connected at its lower end to the rocking beam $h$, the opposite end of the said beam $h$, being provided with a roller which fits into a cam groove $j$, made in the cam $i$, fixed to and revolving with the main driving shaft J.

A bail $m$, is pivoted at each side of the machine on a bracket $n$, (see Fig. 1) and each end of it is pivoted to a block $p$, adjustably held to a vertical plunger $q$. An eccentric rod 2, is pivotally connected to the middle of the bail $m$, and is operated by the eccentric 3, fast on the main shaft J, of the machine. The lower end of each plunger $q$, is journaled in a bracket $r$, held to the frame B, of the machine. The upper end of each plunger $q$, is also held in a suitable bracket $s$, held in the frame B, and the said upper end of the plunger is squared or otherwise formed so that while it may move freely vertically, it will not revolve in its bearings. A cross-head $t$, is secured to the upper end of each plunger $q$, and from each cross-head a pair of horns $u$, project.

On reference to Figs. 1, 3 and 5 a pair of jaws $v$, will be observed. These jaws extend across the bottom of the reservoir A, one on each side of the tubes I, and each end of each jaw is supported by an arm $w$, which is pivoted on a plate $x$, vertically adjustable upon the end of the reservoir A. The bracket $y$, is fixed to the end of the reservoir A, and extends between the arms $w$, and from each arm $w$, a spring $z$, projects and butts against the bracket $y$, so that normally the jaws $v$, are held apart by the action of the spring $z$. From each end of each jaw $v$, a pin $a'$ projects and is in the path of the horns $u$.

$b'$ is a roll of paper carried over the endless apron K, and moves with the said apron. A clamping bar $d'$, extends across the machine and holds the paper $b'$, against the endless apron K, and keeping the paper straight prevents it being lifted by the adhesion of the "drop." The clamping bar $d'$, is secured to the arms $e'$, which are pivoted to the frame B, of the machine, as indicated, so that the bar $d'$, may move freely vertically when the table $d$ comes in contact with the bottom of the apron K.

$f'$, is a cutter preferably with a serrated edge, as indicated. This cutter is journaled in the brackets $g'$, and is set so that it will be immediately over the groove $b$, in the metal plate $a$. A crank-arm $h'$, is fixed to the spindle of the cutter $f'$, and is held by the spring $j'$, so that in its normal position the cutter $f'$, shall be held clear of the paper $b'$, as indicated in the drawings. An arm $k'$, is pivoted on the frame B, and is held in the position indicated in the drawings, by the pivoted dog $m'$. A long arm $n'$, is pivoted on the shaft M, and is held in the position indicated in the drawings by projecting below the block $o'$, (see Fig. 6) formed on the pivoted dog $p'$, which is held in the path of the end of the long arm $n'$, by the action of the spring $q'$. A crank arm $r'$, extends from the arm $n'$ and a pawl $s'$, is pivoted on it. This pawl rests, as indicated in Fig. 1, on the periphery of the disk $t'$, fixed to the shaft M. A projection $u'$, is formed on the periphery of the disk $t'$, as shown, and a finger $v'$, projects beyond the said periphery, as indicated, so that in revolving with the said disk, the finger $v'$, will come in contact with the curved end $w'$, (see Fig. 6) of the dog $p'$. A pin $x'$, projects from the long arm $n'$, above the dog $m'$, and from the weight of the said long arm $n'$, a pin $y'$, projects and from the arm $k'$, a spring pin $z'$, projects.

Immediately below the apron K, at the point indicated in Fig. 2, I place what I call an agitator 5. This is composed preferably of two or more wings supported in suitable journals located in the frame of the machine. The spindle of the agitator being provided with a pulley 4, connected to the chief pulley 6, geared or otherwise fastened to the shaft J. The revolving of the main shaft J, will thus impart a rotary movement to the agitator 5, the wings of which strike the apron K, agitating the paper $b'$ resting on the said apron. This agitation is for the purpose of causing the glutinous liquids, out of which the "drops" are made, to settle in proper shaped "drops" after it leaves the tubes.

I have now referred to all the mechanical parts involved in my machine, but I have not explained yet the entire operation of the various motions, but shall now proceed to explain them briefly.

I have already explained that the reservoir A, contains the composition out of which the "drops" are to be made and that the atmospheric pressure forces the said composition through the tubes I. The drawings show the mechanism set in the position it should appear during the period that the composition is being forced out through the tubes and as all the moving parts of the machine are connected to and driven by the driving shaft J, all the parts will necessarily work in conjunction with each other and follow in the proper succession necessary to accomplish the desired end which is to deposit the "drops" in rows upon the paper $b'$, by squeezing them out of the tubes holding the said tubes closed until the paper is moved the distance of one row and then when a sufficient number of rows of "drops" has been deposited upon the said paper, cutting the said paper and delivering the paper carrying the "drops" onto a tray ready to carry to the drying room. The paper $b'$, moves with the apron K, and as this apron is automatically moved by the action of the ratchet wheel R, the said paper moves automatically at each action of the pawl T. Owing to the arrangement of the mechanism already described, the stroke of the pawl T, may be altered as desired so that the paper $b'$, shall be moved the required distance. During the period that the composition is being squeezed through the tubes I, the table $d$ is held up as indicated in the drawings, so as to hold the paper $b'$, close to the ends of the tubes I. Immediately that the proper quantity of composition has been squeezed from the tubes, the cross-head $t$, is moved up so as to bring the horns $u$, against the pins $a'$, which action forces the jaws $v'$ against the tubes I, thus closing the said tubes and at the same time squeezing the composition out of the ends of the said tubes forming a drop for each tube, like that shown in Fig. 7, and as the tubes I, are arranged in a row, a corresponding row of "drops" is deposited upon the paper $b'$. Immediately that the deposit is made, the table $d$, drops and carries the paper $b'$, away from the tubes, and the paper $b'$, is then moved by the action of the pawl T, already explained, the required distance ready for the next row of "drops" and by that time the moving mechanism has carried down the cross-head $t$, so as to bring the horns $u$, clear of the pin $a'$, when the jaws $v$, will immediately be opened by the action of the springs, $z$, and the the tubes I, left clear to permit the composition to flow through them. These motions are continued until the desired number of rows has been deposited upon the paper $b'$, when the said paper has an extra motion imparted to it, and is simultaneously cut away from the main web of the paper in the following manner. The disk $t'$, is fixed to the shaft M, and revolves with the said shaft by the action of the ratchet-wheel R, as before described. In the revolution of the disk $t'$, the projection $u'$ is carried past the pawl $s'$, and is in front of the said pawl $s'$, when the finger $v'$, comes against the curved end $w'$ and pushes the dog $p'$, so that its block $o'$, is carried clear of the arm $n'$, which, being released, immediately drops and as the pawl $s'$ is attached to the end of the crank arm $r'$, the end of the said pawl is brought into violent contact with the projection $u'$, thereby forcing the shaft M, to revolve and as the drum L, is connected to the said shaft M, the apron K, is caused to move a distance corresponding with the revolution of the disk, and as the paper $b'$, moves with the apron K, the said paper is moved so as to bring the last row of "drops" clear of the cutter $f'$. When the arm $n'$, drops as described, the pin $x'$, strikes the dog $m'$, tilting the said dog $m'$, so as to carry it clear of the end of the arm $k'$, which, by its own weight, drops so as to bring the pin $z'$, in contact with the crank-arm $h'$, and in this way brings the cutter $f'$, against the paper $b'$, thereby cutting the said paper and leaving it free to be removed from the machine. The pin $y'$ is employed to enable the operator to lift the arm $n'$ after the paper has been cut.

I have explained the mechanism for parting the paper on which the "drops" are deposited from the tubes and mechanism for causing the paper to recede by causing the supporting paper to drop. The mechanism described is what I now consider the best form, but it will of course be understood that the same effect might be produced by providing mechanism which would raise the hopper and in that way part the tubes from the paper which receives the "drops."

I have also described my machine as using a roll of paper, but it will of course be understood that the same effect, so far as some portion of my invention is concerned, might be effected by employing trays or using separate pieces of paper. I therefore, propose to refer in some of my claims to a "drop receiver"

meaning the paper or other receptacle by which the "drops" are formed.

What I claim as my invention is:—

1. A reservoir containing a glutinous liquid and having a tube of rubber or other compressible material extending from it, in combination with means for squeezing the tube to cut off the glutinous liquid and permit the "drop" to fall from the end of the tube; substantially as and for the purpose specified.

2. A reservoir containing a glutinous liquid, and having a tube of rubber or other compressible material extending from it, pneumatic or other means for expelling the glutinous liquid, in combination with means for squeezing the tube to cut off the glutinous liquid and permit the "drop" to fall from the end of the tube; substantially as and for the purpose specified.

3. A reservoir containing a glutinous liquid, having tubes of rubber or other compressible material extending from it, and means for squeezing the tube to cut off the glutinous liquid in combination with a drop receiver intermittently moved in a horizontal direction; substantially as and for the purpose specified.

4. A reservoir containing a glutinous liquid, having tubes of rubber or other compressible material extending from it, and means for squeezing the tube to cut off the glutinous liquid in combination with a drop receiver intermittently moved in a horizontal direction, and mechanism to cause the tubes and drop receiver to part when the "drops" are deposited thereon, substantially as and for the purpose specified.

5. A hermetically sealed reservoir containing a glutinous liquid and having tubes of rubber or other compressible material extending from it, in combination with an air pump connected to the reservoir and a safety valve located thereon, substantially as and for the purpose specified.

6. A hermetically sealed reservoir containing a glutinous liquid, subjected to pneumatic pressure, a safety valve placed upon the reservoir from which reservoir tubes of rubber or other compressible material project, and means for squeezing the tube to cut off the glutinous liquid in combination with intermittently moving paper carried below the tubes, substantially as and for the purpose specified.

7. A reservoir containing a glutinous liquid and having tubes of rubber or other compressible material extending from it, a web of paper carried below the tubes and intermittently moved in a horizontal direction, in combination with mechanism by which the paper receives at regular intervals an extra horizontal movement and mechanism for cutting the paper immediately after said extra movement, substantially as and for the purpose specified.

8. A reservoir containing a glutinous liquid and having tubes of rubber or other compressible material extending from it, pneumatic or other means for expelling the glutinous liquid from the tubes, means for squeezing the tubes to restrain at given intervals the flow of glutinous liquid through them, in combination with a drop receiver intermittently moved in a horizontal direction, and mechanism to cause the paper to recede from the tubes when the "drops" are deposited thereon, substantially as and for the purpose specified.

9. A reservoir containing a glutinous liquid and having tubes of rubber or other compressible material extending from it, pneumatic or other means for expelling the glutinous liquid from the tubes, means for squeezing the tubes to restrain at given intervals the flow of glutinous liquid through them, in combination with an endless apron carrying a drop receiver intermittently moved in a horizontal direction, mechanism to cause the drop receiver to recede from the tubes when the "drops" are deposited and mechanism to impart a vibratory motion to the drop receiver after it has receded from the tubes, substantially as and for the purpose specified.

10. A hopper-shaped reservoir A, containing a glutinous liquid and provided with a hermetically sealed detachable cover C, a pipe E, connecting the interior of the reservoir A, with the air pump F, a series of tubes I, extending from the bottom H, of the reservoir and a pair of jaws $c$, extending across and on each side of the tubes, in combination with means for intermittently moving the jaws to grip the tubes, substantially as and for the purpose specified.

11. A reservoir containing a glutinous liquid, a series of tubes extending from it, a pair of jaws $v$, suspended from the arms $w$, which are respectively pivoted on the independent vertical plate, a bracket $y$, located between the arms $w$, each provided with a spring $z$, arranged to act against the bracket $y$, a pin $a'$, projecting from each jaw $v$, in combination with a vertically moving plunger having a cross-head $t$, with horns $u$, formed on it and operated so that the horns $u$, will intermittently come in contact with the pin $a'$, in such a manner as to force the jaws $v$, against the tubes, substantially as and for the purpose specified.

12. An endless apron K, supported at one end by the drum L, and carrying a web of paper $b'$, a suitably journaled shaft M, fixed to the drum L, and having a spur-wheel N, fixed to it which drives the rollers Q, and a ratchet wheel R, fixed to the shaft M, in combination with an eccentric U, fixed to the driving shaft J, adapted to operate the pawl with the ratchet-wheel for the purpose of imparting an intermittent motion to the endless apron K, and paper $b'$, substantially as and for the purpose specified.

13. A hinged table $d$ located below the endless apron K, and paper $b'$, which derives an intermittent motion, in combination with a cam $i$ fixed to the shaft J, rocking beam $h$ operated by said cam, and the rod $g$ connecting the beam to the table and arranged to impart at regular intervals a vertical movement to the table, substantially as and for the purpose specified.

14. The combination with an intermittently moving apron K supporting a drop receiver of a revolving agitator 5, arranged to impart a vibratory motion to the said apron, substantially as and for the purpose specified.

15. A long arm $n'$, pivoted on the shaft M, and supported by the block $o'$, formed on the spring dog $p'$, a crank arm $r'$ extending from the arm $n'$ and carrying the pawl $s'$, in combination with the disk $t'$ fixed to the shaft M, a projection $u'$, and a finger $v'$, arranged substantially as and for the purpose specified.

16. A cutter $f'$, suitably journaled in the frame of the machine and extending across the face of the paper $b'$, a crank arm $h'$, fixed to the cutter $f'$ and actuated by a spring $j'$, in combination with the arm $k'$ and mechanism for causing the said arm to fall and strike the crank $h'$, substantially as and for the purpose specified.

17. A cutter $f'$, suitably journaled in the frame of the machine and extending across the face of the paper $b'$, a crank arm $h'$, fixed to the cutter $f'$ and actuated by a spring $j'$, in combination with the dog $m'$, pin $x'$, pivoted arm $n'$ and spring dog $p'$, substantially as and for the purpose specified.

18. An endless apron intermittently moved and supporting a web of paper, a grooved metal plate held stationary on a line with the main surface of the apron and below the paper, rollers to carry the apron below and clear of the stationary plate, in combination with a cutter extending across the surface of the paper immediately above the grooved plate and operated by mechanism to bring it at certain intervals in contact with the paper, substantially as and for the purpose specified.

Toronto, June 30, 1892.

THOMAS ROBERTSON.

In presence of—
  A. M. NEFF,
  J. EDW. MAYBEE.